Figure 1:
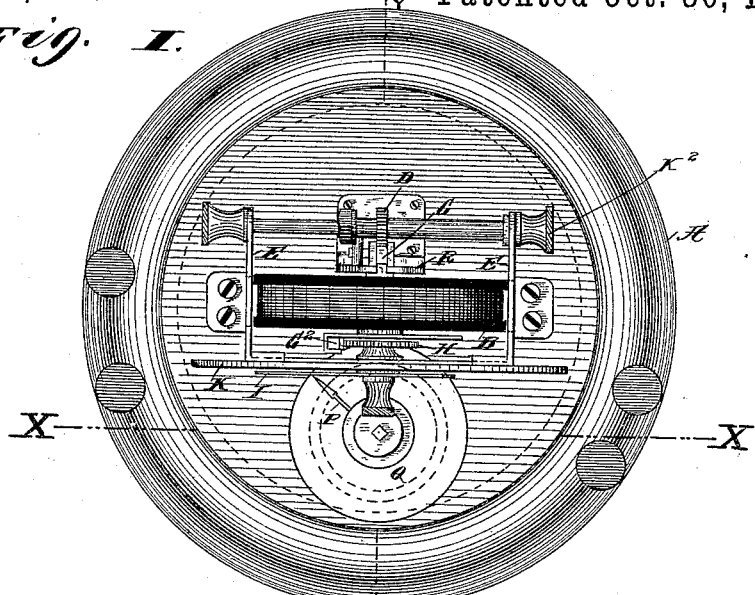

(No Model.)　　　　　　　　　　　　　　　　3 Sheets—Sheet 1.
V. H. EMERSON.
ELECTRICAL MEASURING INSTRUMENT.

No. 392,018.　　　　　　　　　　Patented Oct. 30, 1888.

Attest:
Geo. H. Botts.
Hns. F. Capel.

Inventor.
Victor H. Emerson,
By Townsend,
& MacArthur,
Attys.

(No Model.) 3 Sheets—Sheet 2.

V. H. EMERSON.
ELECTRICAL MEASURING INSTRUMENT.

No. 392,018. Patented Oct. 30, 1888.

Attest:
Geo. H. Botts.
Wm. H. Capel.

Inventor:
Victor H. Emerson
By Townsend & MacArthur,
Attys.

(No Model.) 3 Sheets—Sheet 3.

V. H. EMERSON.
ELECTRICAL MEASURING INSTRUMENT.

No. 392,018. Patented Oct. 30, 1888.

Attest:
Geo. H. Botts.
Jno. H. Capel.

Inventor:
Victor H. Emerson,
By Townsend
P. MacArthur,
Atty's.

UNITED STATES PATENT OFFICE.

VICTOR H. EMERSON, OF NEW YORK, N. Y., ASSIGNOR OF ONE-HALF TO HERBERT F. SEIP, OF EASTON, PENNSYLVANIA.

ELECTRICAL MEASURING-INSTRUMENT.

SPECIFICATION forming part of Letters Patent No. 392,018, dated October 30, 1888.

Application filed February 10, 1888. Serial No. 263,565. (No model.)

*To all whom it may concern:*

Be it known that I, VICTOR H. EMERSON, a citizen of the United States, and a resident of New York, in the county of New York and State of New York, have invented a certain new and useful Electrical Measuring-Instrument, of which the following is a specification.

The object of my present invention is to produce a simple and cheap electrical measuring-instrument which may be employed for the measurement of electrical resistances or electric currents.

My invention comprises a novel combination of inducing coils or conductors and a magnetic needle or similar element arranged and combined to operate as an induction-balance; and the invention consists in the combination, with a magnetic needle or its equivalent, of two coils or conductors arranged to act oppositely upon said needle, so as to tend to turn the same in opposite directions, and proper mechanism for changing the relative position of either or both of the coils to the needle, so as to permit a balance of inductive actions to be established when different currents are flowing in said coils. The change in the inductive relation of the coils and needle may be obviously produced by moving the coil bodily to or from the needle, or by turning the coil so that the angle of its inductive plane to the line of the needle may be varied.

My invention consists, also, in the combination, with the movable coil or coils, of a proper index and scale whose movable element is connected with the movable coil and which is properly graduated to indicate ohms or ampères of current, as desired.

I have herein described my apparatus as arranged and scaled for the purposes of measuring electrical resistances; but, as will be obvious to electricians, the same apparatus in all its essential details might be employed also for measuring currents, a proper change being made in the graduation of the scale.

My invention consists, further, in certain details of construction and combination of parts, that will be more specifically defined in the claims.

Figure 2:
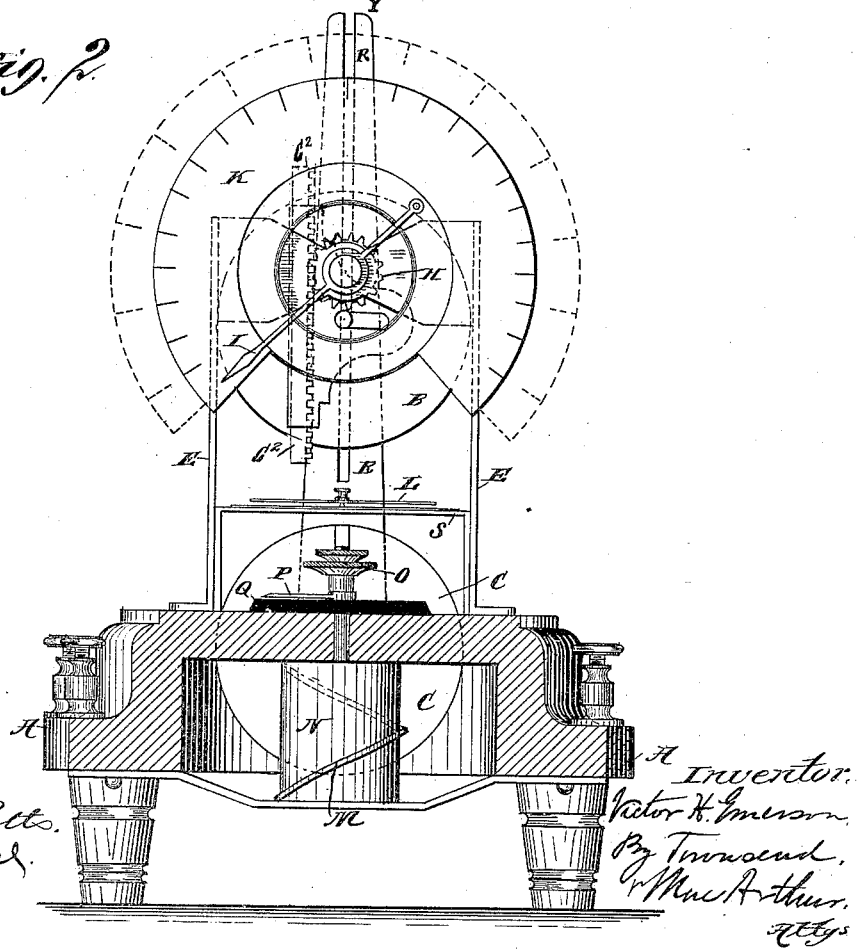
Figure 3:
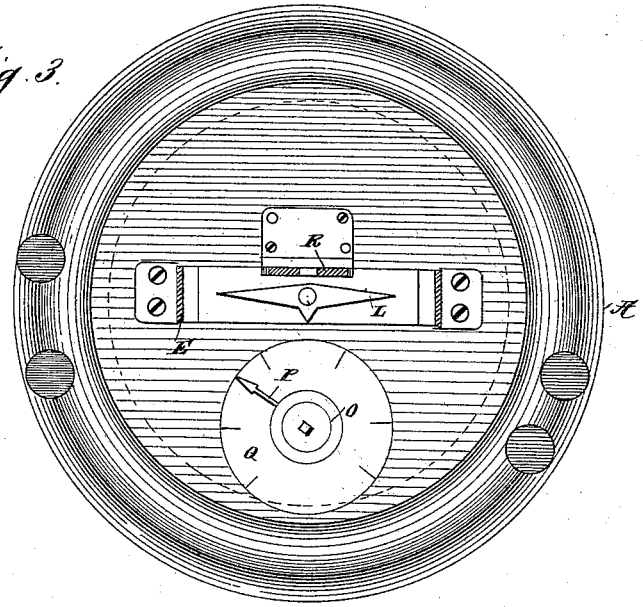
Figure 4:
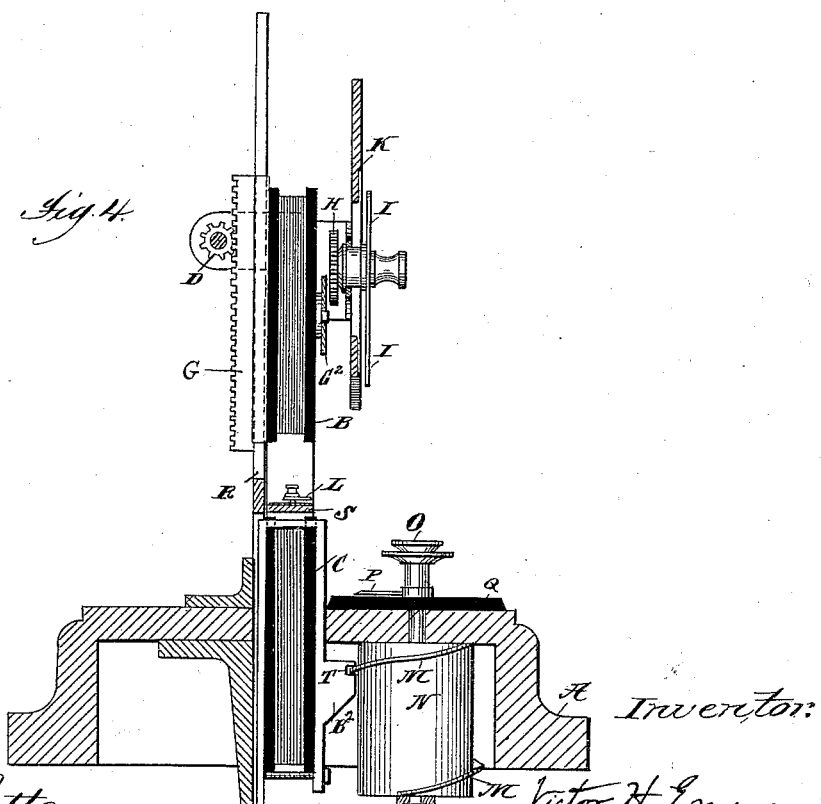
Figure 5:
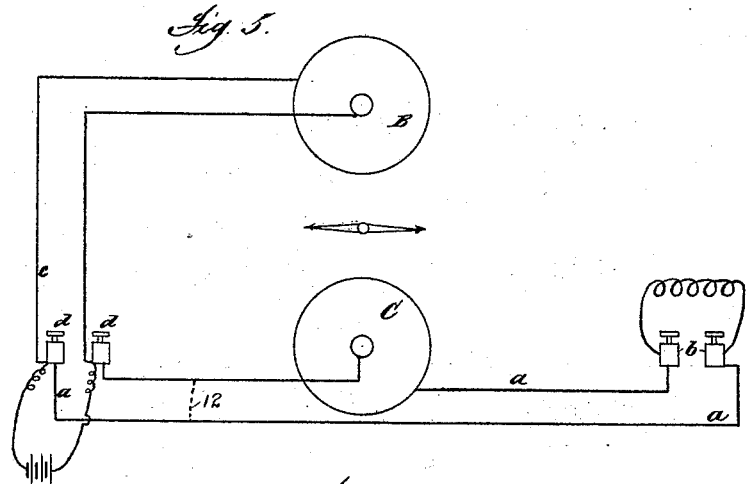
Figure 6:
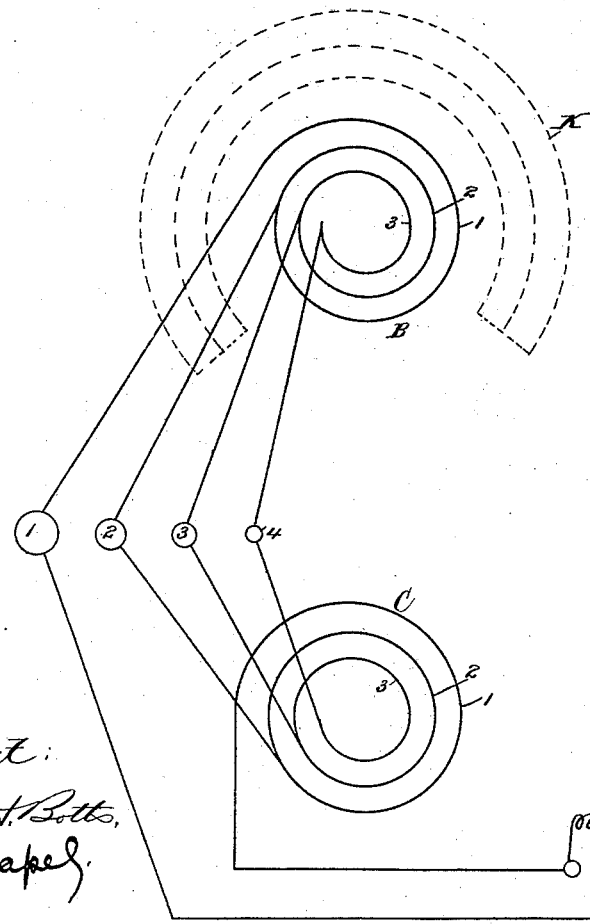

In the accompanying drawings, Figure 1 is a plan of an apparatus embodying my invention. Fig. 2 is a front elevation of the same, the base being shown in section on the line X X, Fig. 1. Fig. 3 is a horizontal cross-section through the lower part of the apparatus. Fig. 4 is a side elevation of the apparatus, the parts being shown in section. Fig. 5 is a diagram illustrating one manner of using the apparatus. Fig. 6 is a diagram illustrating the manner of using the apparatus when the coils are wound in sections.

A indicates the base of the apparatus, upon which is sustained the frame E, carrying dial K and pointer I.

L indicates a magnetic needle sustained on a cross-piece, S, and B indicates a coil formed after the manner of a galvanometer-coil and carried in a suitable spool, which is properly attached to or supported by a movable rack, G, that slides up and down in an upright, R, for the purpose of changing the position of the coil with relation to the needle, and thereby modifying the inductive influence of the same upon the needle when a given current flows in the coil. Beneath the needle is mounted a second coil or conductor, C, carried in a suitable spool, that in turn is mounted in the frame $B^2$. The latter may also be capable of moving up and down in a suitable guide, as will be presently described, or may be made stationary and arranged at such distance below the needle that when the upper coil is brought to within the same distance from the top of the needle the pointer on the scale J will stand at zero.

A mechanism which would be suitable for moving the lower coil up and down consists of a vertical cylinder, N, having a spiral flange or thread, M, on its periphery, which engages with a notch at T in the frame $B^2$. The cylinder N is provided with a thumb-piece or handle, O, by which it may be turned for the purpose of moving the lower coil, C, up or down. Connected with the stem of the cylinder N is a pointer, P, adapted to move over a scale, Q.

The upper coil may be moved up and down by means of a thumb-nut or handle, $K^2$, attached to a horizontal shaft which turns in proper bearings in the frame E, and which is provided with a pinion, D, meshing with the rack G.

Motion is communicated to the needle I by means of a rack, G², attached to the spool for the upper coil, B, and gearing with a pinion, H, upon the needle-shaft in obvious manner.

The coils B C, either or both, may be wound sectionally for a purpose to be presently described. It will be assumed, however, for the sake of simplicity in describing the operation of the apparatus, that but a single coil is used, the terminals of coil B being connected, as indicated in Fig. 5, to the binding-posts $d$, while the terminals of coil C are connected, respectively, one with a binding-post $d$ and the other with one of the binding-posts $b$. The remaining binding-post $d$ connects with the other binding-post $b$, so that if a battery be connected to the two binding-posts $d$ and at the same time a circuit be made between the posts $b$ current will flow in two legs or branches, $c\ a$, one including coil B and the other coil C.

To measure an electric resistance, the instrument is placed so that the plane of the coils will be in the magnetic plane in which the needle lies by reason of the earth's magnetism, and said needle will point at the zero-mark on its support. A suitable battery being connected with the binding-posts $d$ and the resistance to be measured being connected with the binding-posts $b$, as indicated in the diagram, current will obviously flow in the two legs or branches $c\ a$ in inverse proportion to the resistances—that is to say, more current will flow in B than in C. It is to be assumed at the outset that the resistances offered by the coils and the connecting-wires in the two branches $a\ c$ are approximately the same, and that with equal current flowing in the two coils their inductive influence, when both are at the same distance from the needle will be the same. It is further to be assumed that the connections are such that the coils would tend to turn the needle in opposite directions, and that therefore when the coils are at the same distance from the needle there will be a balance of inductive influences and the needle will stand at the zero-point. The resistance to be measured having been included in one of the branches—as, for instance, $a$—it is obvious that there will be a want of balance in the effects of the two coils B C on the needle, and the latter would therefore be deflected to one side, owing to the superior influence of, say, coil B. The coil included in the branch or leg $c$ is now to be moved away from the needle, or to be otherwise moved so as to change its inductive relation to the latter, with the effect of diminishing its inductive influence. This movement should be continued until the balance of inductive influences is established, so that the needle will again point to the zero-mark. The balance having been established, the resistance in the leg $a$ may be read upon the scale of the instrument, which, it will be understood, is properly graduated to ohms empirically—that is to say, by including successively in the leg $a$ different resistances and marking upon the scale the point at which the index I stands when the coil B stands at such a point that the effects of induction upon the needle have been established.

It will be obvious that my apparatus with a proper scale might be employed for measuring the strength of electric currents, one of the coils being made to carry the standard current and the other the current to be measured, the balance of the coils being established as before, and the current measured upon the scale suitably graduated for the purpose. When so used, it is obvious that the coils would have to be in independent circuits, and the branch $a$ would therefore have to be disconnected from the binding-posts $d\ d$ and connection made as indicated by the dotted line 12, so that the coil C could be included in circuit with a standard battery connected to posts $b$, and the coil B could be placed in the circuit of the current to be measured. It is obvious that the connections of the standard battery and standard current might be transposed, the coil C being then made the movable coil and the current measured read upon the properly-graduated scale Q. Other uses of the instrument will suggest themselves to skilled electricians.

The capacity of the instrument may be somewhat enlarged by making the lower coil, C, movable by the means described; but in such case the measurements would begin with the coil C occupying a position below that indicated, so as to permit it to be moved upward toward the needle. When the instrument is used in this way with the coil C normally at the lower initial position, it may sometimes occur that the index I will have been moved to the limit of its scale without obtaining a balance, the reason being that the top coil, B, is too strong and the bottom not strong enough in its influence upon the needle. If, however, the lower coil can be moved up toward the needle to increase its influence, then by starting again at the zero on the scale for the upper needle a balance may be reached, because the lower coil will have more influence.

It is obvious that by properly graduating the lower dial the total resistance to be measured can be ascertained by adding the indications of the lower dial to those of the upper dial, which would be properly graduated for this condition. In this case it is plain that the lower dial would give the coarse indications, and the finer indications would be read from the upper dial.

In using the instrument with a small external resistance it is of course desirable to have the coils also of low resistance, in order to obtain sensitiveness and accuracy of measurement. With higher resistances the resistance of the coil should be also larger, because with a low resistance in the coils a high resistance in the side $a$ would practically force all the current into the leg or branch $c$ and the effects of the coil in the side $a$ would be so small that an accurate measurement could not be obtained.

In order to adapt the instrument to use under the varied conditions described, I therefore preferably make each coil as a sectional coil, the sections of which are connected in series, while the terminals of the series and the junctions of the sections are connected in regular order to proper binding-posts, as indicated in Fig. 6, where I have shown the coils as each made in three sections. The manner of using the coil as thus organized will be obvious. In measuring a low resistance the battery would be connected with posts 1 and 2, thus utilizing the outer coils only, which are those nearest the needle, and which alone are of comparatively small resistance. With a higher resistance connection might be made with parts 1 and 3, thus bringing coil 2 into circuit in series with coil 1 and increasing the resistance of the coils in action. Similarly the whole coil might be used by connecting to 1 and 4, thus throwing all the sections into circuit in series with one another. A suitable scale is to be used for each of the cases supposed.

I do not limit myself to any particular mechanism for communicating a movement from the operating devices for the coils to the dials or pointers, nor to any particular mechanism for moving the coils, as my invention consists, essentially, in measuring the resistance or the current, as the case may be, by the means of two coils arranged to act inductively upon a needle in opposite ways and by moving one of said coils, so as to change its inductive relation to said needle, until a balance of inductive influences is established.

What claim I as my invention is—

1. In an electrical measuring-instrument, the combination, substantially as described, of two coils, a magnetic needle upon which said coils act and which they tend to turn in opposite directions, and mechanism for changing the relative position of the coils and needle, whereby with different currents flowing in said coils a balance of inductive influence upon the needle may be obtained, as and for the purpose described.

2. The combination, with the needle, of the two oppositely-acting coils, one of which is mounted so as to be movable in its inductive relation to the needle, and an indicating device graduated to ohms and connected with the movable coil, as and for the purpose described.

3. The combination, with the needle, of the two coils acting on the same oppositely, a movable support for one coil, whereby the same may be moved away from the needle, and an index and scale the movable member of which is mechanically connected with the movable coil, as and for the purpose described.

4. The combination, with the needle, of the two oppositely-acting sectional coils, the sections of which are connected in series, and electrical connections to the junctions of the sections, as and for the purpose described.

5. The combination, with a magnetic needle, of the two coils, one mounted upon or suitably attached to a vertical rack, a shaft and pinion for communicating a movement to said coil away from the needle, and mechanism for communicating the movement of the coil to a suitable pointer moving over a scale, as and for the purpose described.

6. The combination, with the needle, of the two coils arranged to act upon the same oppositely and each mounted upon a suitable support, whereby its distance from the needle may be increased, as and for the purpose described.

7. The combination, with the needle, of the upper coil, B, mounted on a suitable movable support, an index and scale for said coil, and a lower coil, C, also mounted upon a suitable support, whereby it may be moved up toward the needle, as and for the purpose described.

Signed at Easton, in the county of Northampton and State of Pennsylvania, this 4th day of February, A. D. 1888.

VICTOR H. EMERSON.

Witnesses:
　Mrs. H. F. SEIP,
　HENRY LEWIS.